(12) United States Patent
Bailey et al.

(10) Patent No.: US 10,640,913 B2
(45) Date of Patent: May 5, 2020

(54) CLIP, HANGER AND METHOD OF USING THE SAME

(71) Applicants: Randy Bailey, West Valley City, UT (US); Susan Bailey, West Valley City, UT (US)

(72) Inventors: Randy Bailey, West Valley City, UT (US); Susan Bailey, West Valley City, UT (US)

( * ) Notice: Subject to any disclaimer, the term of this patent is extended or adjusted under 35 U.S.C. 154(b) by 0 days.

(21) Appl. No.: 15/990,786

(22) Filed: May 28, 2018

(65) Prior Publication Data

US 2018/0340281 A1 Nov. 29, 2018

Related U.S. Application Data

(60) Provisional application No. 62/511,997, filed on May 27, 2017.

(51) Int. Cl.
| | |
|---|---|
| *D06F 55/02* | (2006.01) |
| *D06F 95/00* | (2006.01) |
| *D06C 3/04* | (2006.01) |
| *D06F 55/00* | (2006.01) |
| *F16B 7/04* | (2006.01) |
| *F16B 2/10* | (2006.01) |
| *F16B 45/00* | (2006.01) |

(52) U.S. Cl.
CPC ............. *D06F 95/008* (2013.01); *D06C 3/04* (2013.01); *D06F 55/00* (2013.01); *F16B 2/10* (2013.01); *F16B 7/04* (2013.01); *F16B 45/00* (2013.01)

(58) Field of Classification Search
CPC .......... D06F 95/008; D06F 55/02; F16B 2/10; A41B 11/002; Y10S 24/29; Y10T 24/44915; D06C 3/04
See application file for complete search history.

(56) References Cited

U.S. PATENT DOCUMENTS

| | | | | |
|---|---|---|---|---|
| 1,172,937 | A * | 2/1916 | Butcher | A47G 25/743 211/113 |
| 1,275,582 | A * | 8/1918 | Mascellino | A61M 16/0666 24/338 |
| 2,122,309 | A * | 6/1938 | Beimler | A47G 25/32 223/85 |
| 2,499,188 | A * | 2/1950 | Freeman | A47G 25/32 211/113 |

(Continued)

FOREIGN PATENT DOCUMENTS

DE 102007046590 A1 * 4/2009 ............ D06F 55/02

*Primary Examiner* — Joshua T Kennedy
(74) *Attorney, Agent, or Firm* — Miller IP Law, LLC

(57) ABSTRACT

A clipping apparatus is described herein. The clipping apparatus may include a u-shaped clasp and a tab. The clasp may include an open end and a closed end, a first side and a second side, and a tongue. The tab may be coupled to, and extend from, the closed end of the clasp. The first side may include a wall extending from the closed end to the open end. The second side may include two prongs extending from the closed end to the open end. The tongue may be rotatably connected to the two prongs between the two prongs. The tab may include a first opening and a second opening. The first opening may be disposed in the tab adjacent to the closed end of the clasp. The second opening may be disposed in the tab at a distal end to the tab from the clasp.

20 Claims, 13 Drawing Sheets

(56) References Cited

U.S. PATENT DOCUMENTS

| | | | | |
|---|---|---|---|---|
| 3,405,429 | A | * | 10/1968 | Vazquez .............. A47G 25/485 24/531 |
| 4,520,536 | A | * | 6/1985 | Hata ........................ A41F 9/00 2/320 |
| 5,884,372 | A | * | 3/1999 | Anscher .................... F16L 3/02 24/3.12 |
| 5,944,236 | A | * | 8/1999 | Cinque ................ D06F 95/008 223/1 |
| 6,463,636 | B1 | * | 10/2002 | Friedewald .......... A41B 11/002 24/2 |
| RE42,568 | E | * | 7/2011 | Artemi ............... A47G 25/1471 248/214 |
| 8,578,571 | B2 | * | 11/2013 | Schmidt ................. F16B 2/005 24/536 |
| 2014/0097214 | A1 | * | 4/2014 | Schreckenhofer ..... A47G 25/48 223/85 |

\* cited by examiner

CLIP, HANGER AND METHOD OF USING THE SAME

RELATED APPLICATION

This application claims priority to U.S. Provisional Patent Application No. 62/511,997 by Randy Bailey, et al, filed May 27, 2017, and entitled "Laundry and Closet Organizer and Clothing Clip," the entirety of which is incorporated herein by reference.

FIELD OF THE INVENTION

This disclosure generally relates to clips and clamps. More specifically, the disclosure relates to clips for flexible materials and means for attaching such a clip to another object as the clip holds yet another object.

BACKGROUND

Many flexible materials, such as cloth materials, undergo soiling in the process of use, and must be washed to maintain the material in a usable state. Some objects made of such flexible materials have a size and shape that make the objects susceptible to misplacement and/or loss. This may be compounded when such objects are typically paired with other like objects in use, such that loss of one of the paired objects results in unsuitability of the complete pair for use, including the still-possessed object of the pair. One example of such objects is pairs of socks worn on feet. Previous solutions have attempted to design clamps that hold objects together as the objects are washed. However, previously-designed clamps have either been challenging for users to open and attach to objects, or have not provided strong enough grip to keep paired objects together during washing, especially during an agitation phase of a machine-washing system. Accordingly, improvements are needed.

SUMMARY OF THE INVENTION

A clipping apparatus is described herein. The clipping apparatus may include a u-shaped clasp and a tab. The clasp may include an open end and a closed end, a first side and a second side, and a tongue. The tab may be coupled to, and extend from, the closed end of the clasp. The first side may include a wall extending from the closed end to the open end. The second side may include two prongs extending from the closed end to the open end. The tongue may be rotatably connected to the two prongs between the two prongs. The tab may include a first opening and a second opening. The first opening may be disposed in the tab adjacent to the closed end of the clasp. The second opening may be disposed in the tab at a distal end of the tab from the clasp.

One or more of the tongue and the first side may include a set of teeth. In embodiments where the tongue includes a set of teeth, the teeth may extend from the tongue towards the first side. In embodiments where the first side includes a set of teeth, the teeth may extend from the first side towards the tongue. In some embodiments, the first side may include a first set of teeth extending from the first side towards the tongue, and the tongue may include a second set of teeth extending from the tongue towards the first side. Additionally, in some embodiments, one or more teeth of the set or sets of teeth may extend towards the closed end of the clasp.

The clipping apparatus may further include a ridge on an exterior surface of a first one of the two prongs. The ridge may be disposed adjacent to the tongue.

The tongue may include a protrusion extending from the tongue towards a first one of the two prongs. The protrusion may be disposed on the tongue at an end of the tongue opposite a pivot point of the tongue about which the tongue rotates between the two prongs. The first one of the two prongs may include a plurality of cavities corresponding to the protrusion. The cavities may be disposed on the first one of the two prongs along an arc traced by the protrusion as the tongue rotates about the pivot point.

The tongue and the two prongs may be connected by one or more pivot rods that extend from the two prongs and into the tongue. The pivot rod may be disposed at the open end portion of the two prongs.

A hanger-and-clip system is also described herein. The system may include a clip and a hanger. The clip may include a u-shaped clasp and a tab. The clasp may include an open end and a closed end, a first side and a second side, and a tongue. The tab may be coupled to, and extend from, the closed end of the clasp. The first side may include a wall extending from the closed end to the open end. The second side may include two prongs extending from the closed end to the open end. The tongue may be rotatably connected to the two prongs between the two prongs. The tab may include a first opening and a second opening. The first opening may be disposed in the tab adjacent to the closed end of the clasp. The second opening may be disposed in the tab at a distal end of the tab from the clasp. The hanger may include a hook, an eyelet and a collar. The eyelet may be coupled to the hook by a shaft. The collar may be disposed along the shaft between the eyelet and the hook. The clip may be connected to the hanger by a strap passing through the eyelet and the second opening.

The hanger may include a second collar disposed along the shaft between the eyelet and the first collar. A portion of the shaft may extend between the two collars. The first and/or second collar may be conical. One or more of the first collar, the second collar, the shaft, the eyelet and the hook may be monolithic.

A method of washing a cloth material using a hanger-and-clip system is also described herein. The method may include securing the cloth material to the hanger-and-clip system. The system may include a clip and a hanger. The clip may include a u-shaped clasp and a tab. The clasp may include an open end and a closed end, a first side and a second side, and a tongue. The tab may be coupled to, and extend from, the closed end of the clasp. The first side may include a wall extending from the closed end to the open end. The second side may include two prongs extending from the closed end to the open end. The tongue may be rotatably connected to the two prongs between the two prongs. The tab may include a first opening and a second opening. The first opening may be disposed in the tab adjacent to the closed end of the clasp. The second opening may be disposed in the tab at a distal end of the tab from the clasp. The hanger may include a hook, an eyelet and a collar. The eyelet may be coupled to the hook by a shaft. The collar may be disposed along the shaft between the eyelet and the hook. The clip may be connected to the hanger by a strap passing through the eyelet and the second opening.

The hanger-and-clasp system may further include a fastener attached to the shaft between the collar and the eyelet. The method may further include placing the cloth over the hook and/or securing the cloth over the hook with the fastener.

The method may further include placing the hanger-and-clip system with the secured cloth into a washing machine. The method may further include providing a reward after securing the cloth material to the hanger-and-clip system or placing the hanger-and-clip system with the secured cloth into the washing machine. The reward may include a token. The token may represent a value corresponding to one or more prizes redeemable with the token. The token may include a color corresponding to a color of the hanger such that the token and hanger are color-coded.

BRIEF DESCRIPTION OF THE DRAWINGS

A more particular description of the apparatuses, systems and methods summarized above is made below by reference to specific embodiments. At least some such embodiments are depicted in drawings included with this specification, in which.

DETAILED DESCRIPTION

Figure 1:
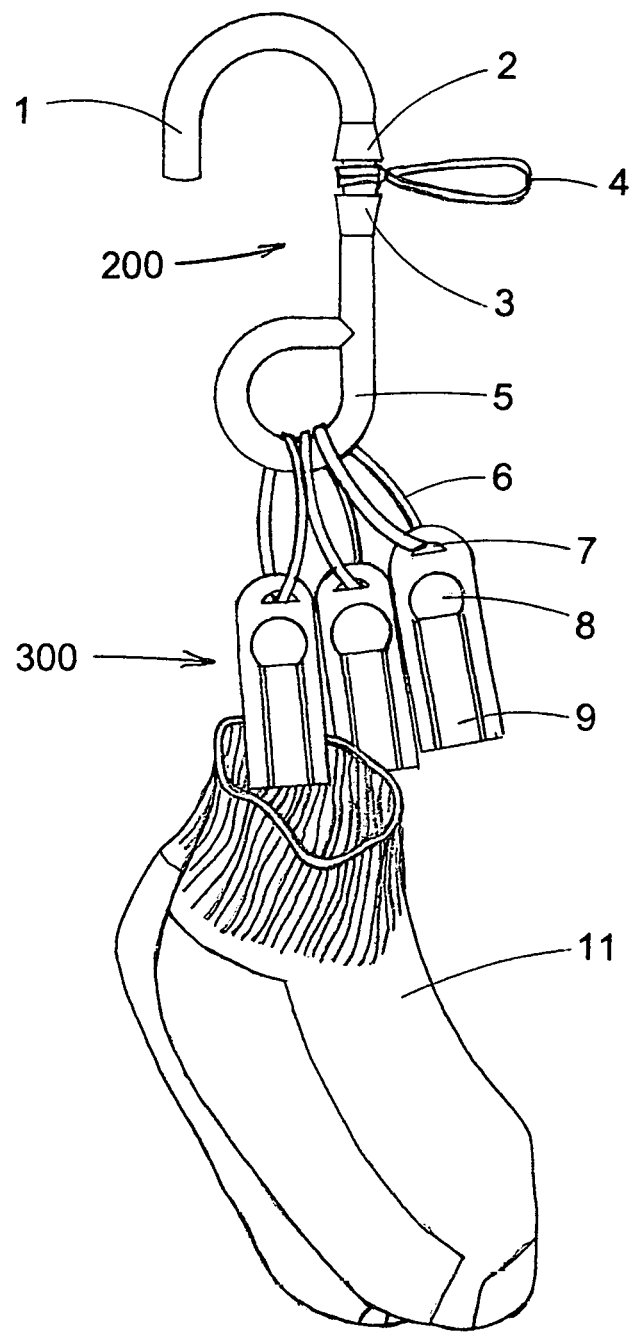
FIG. 1 depicts a hanger-and-clip system with an object secured by the clip.

A detailed description of the claimed apparatuses, systems and methods is provided below by example, with reference to embodiments in the appended figures. Those of skill in the art will recognize that the components as described below and depicted in the figures could be arranged and designed in a variety of different configurations without departing from the substance of the apparatuses, systems and methods claimed. Additionally, aspects of the claimed methods are depicted in flowchart diagrams. Those of skill in the art will recognize that the steps depicted in the flowchart diagrams, though shown in a specific order, may be performed in different orders without departing from the substance of the claimed method. Thus, the detailed description of embodiments in the figures is merely representative, and is not intended to limit the scope of the claimed apparatuses, systems and methods.

Throughout the description below, various elements of the depicted embodiments may be referred to with the same and different numbering for the same elements. For example, an element in one FIG. depicted in a different way in another FIG., such as from a different angle or in a different configuration, may be referred to with different reference numbers in the different FIGS. to differentiate between the various views and configurations.

A clipping apparatus is described herein. The clipping apparatus may include a u-shaped clasp and a tab. The clasp may include an open end and a closed end, a first side and a second side, and a tongue. The tab may be coupled to, and extend from, the closed end of the clasp. The first side may include a wall extending from the closed end to the open end. The second side may include two prongs extending from the closed end to the open end. The tongue may be rotatably connected to the two prongs between the two prongs. The tab may include a first opening and a second opening. The first opening may be disposed in the tab adjacent to the closed end of the clasp. The second opening may be disposed in the tab at a distal end of the tab from the clasp.

One or more the tongue and the first side may include a set of teeth. In embodiments where the tongue includes a set of teeth, the teeth may extend from the tongue towards the first side. In embodiments where the first side includes a set of teeth, the teeth may extend from the first side towards the tongue. In some embodiments, the first side may include a first set of teeth extending from the first side towards the tongue, and the tongue may include a second set of teeth extending from the tongue towards the first side. Additionally, in some embodiments, one or more teeth of the set or sets of teeth may extend towards the closed end of the clasp.

The clipping apparatus may further include a ridge on an exterior surface of a first one of the two prongs. The ridge may be disposed adjacent to the tongue.

The tongue may include a protrusion extending from the tongue towards a first one of the two prongs. The protrusion may be disposed on the tongue at an end of the tongue opposite a pivot point of the tongue about which the tongue rotates between the two prongs. The first one of the two prongs may include a plurality of cavities corresponding to the protrusion. The cavities may be disposed on the first one of the two prongs along an arc traced by the protrusion as the tongue rotates about the pivot point.

The tongue and the two prongs may be connected by one or more pivot rods that extend from the two prongs and into the tongue. The pivot rod may be disposed at the open end portion of the two prongs.

A hanger-and-clip system is also described herein. The system may include a clip and a hanger. The clip may include a u-shaped clasp and a tab. The clasp may include an open end and a closed end, a first side and a second side, and a tongue. The tab may be coupled to, and extend from, the closed end of the clasp. The first side may include a wall extending from the closed end to the open end. The second side may include two prongs extending from the closed end to the open end. The tongue may be rotatably connected to the two prongs between the two prongs. The tab may include a first opening and a second opening. The first opening may be disposed in the tab adjacent to the closed end of the clasp. The second opening may be disposed in the tab at a distal end of the tab from the clasp. The hanger may include a hook, an eyelet and a collar. The eyelet may be coupled to the hook by a shaft. The collar may be disposed along the shaft between the eyelet and the hook. The clip may be connected to the hanger by a strap passing through the eyelet and the second opening.

The hanger may include a second collar disposed along the shaft between the eyelet and the first collar. A portion of the shaft may extend between the two collars. The first and/or second collar may be conical. One or more of the first collar, the second collar, the shaft, the eyelet and the hook may be monolithic.

A method of washing a cloth material using a hanger-and-clip system is also described herein. The method may include securing the cloth material to the hanger-and-clip system. The system may include a clip and a hanger. The clip may include a u-shaped clasp and a tab. The clasp may include an open end and a closed end, a first side and a second side, and a tongue. The tab may be coupled to, and extend from, the closed end of the clasp. The first side may include a wall extending from the closed end to the open end. The second side may include two prongs extending from the closed end to the open end. The tongue may be rotatably connected to the two prongs between the two prongs. The tab may include a first opening and a second opening. The first opening may be disposed in the tab adjacent to the closed end of the clasp. The second opening may be disposed in the tab at a distal end of the tab from the clasp. The hanger may include a hook, an eyelet and a collar. The eyelet may be coupled to the hook by a shaft. The collar may be disposed along the shaft between the eyelet and the hook. The clip may be connected to the hanger by a strap passing through the eyelet and the second opening.

The hanger-and-clasp system may further include a fastener attached to the shaft between the collar and the eyelet. The method may further include placing the cloth over the hook and/or securing the cloth over the hook with the fastener.

The method may further include placing the hanger-and-clip system with the secured cloth into a washing machine. The method may further include providing a reward after securing the cloth material to the hanger-and-clip system or placing the hanger-and-clip system with the secured cloth into the washing machine. The reward may include a token. The token may represent a value corresponding to one or more prizes redeemable with the token. The token may include a color corresponding to a color of the hanger such that the token and hanger are color-coded.

An embodiment of the systems described above is described below with respect to FIGS. 1-2. An embodiment of the clipping apparatus described above is described below with respect to FIGS. 3 and 5-12. An embodiment of the hanger described above is described below with respect to FIG. 4. An embodiment of the methods described above is described below with respect to FIG. 13.

Figure 2:
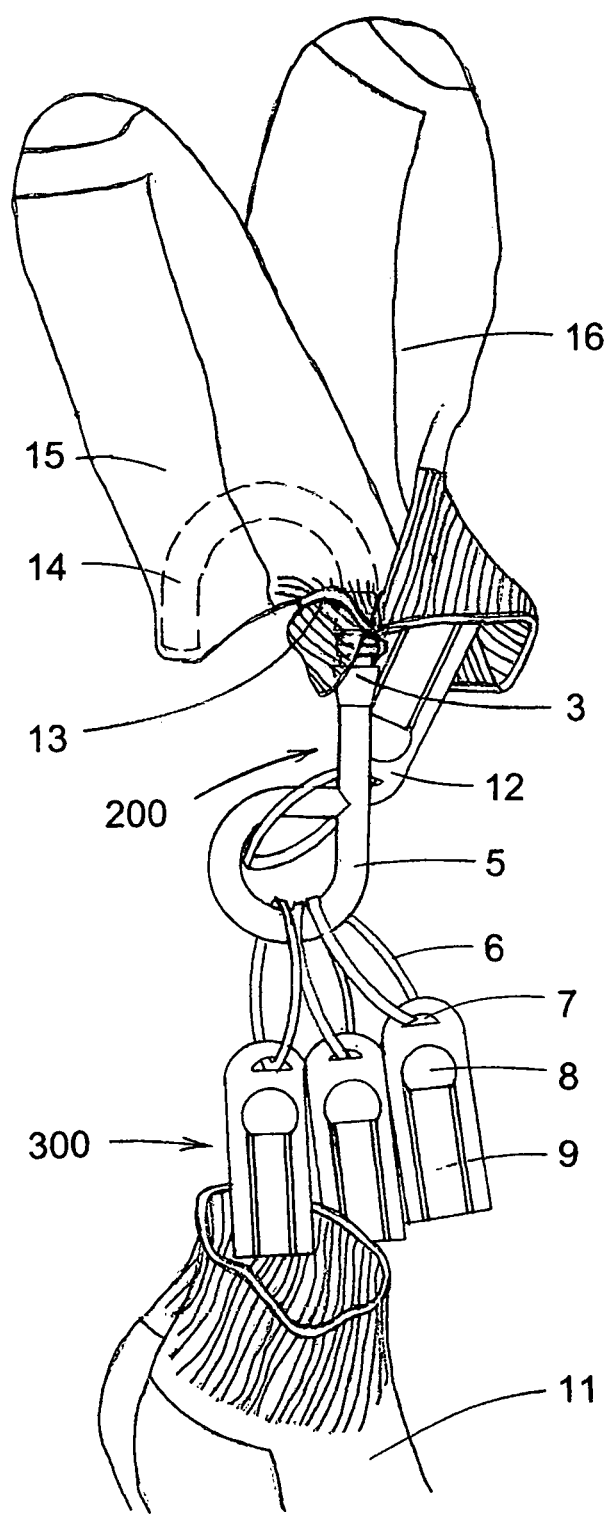
FIG. 2 depicts a hanger-and-clip system prepared for washing of an object secured by the clip.
Figure 3:
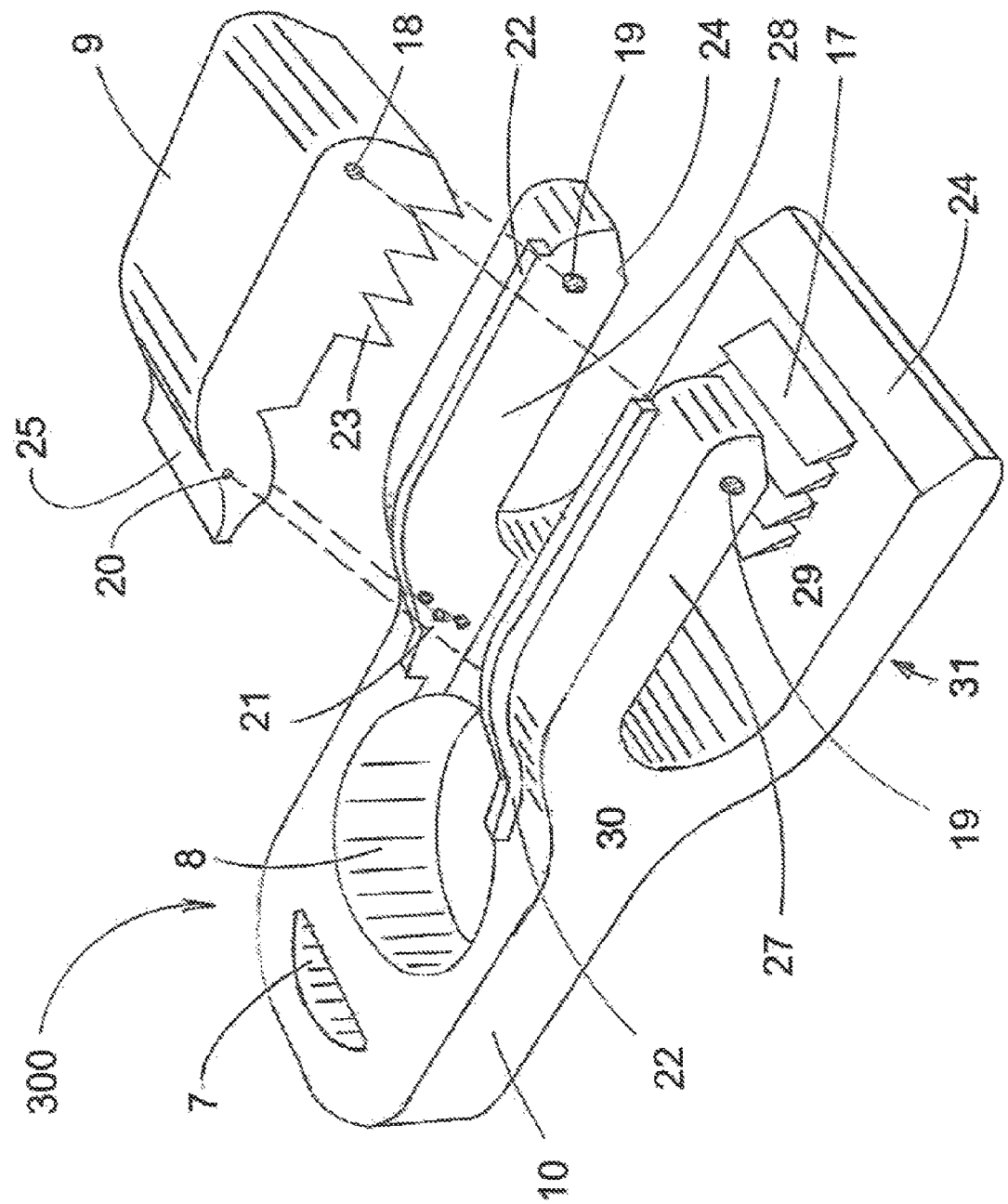
FIG. 3 depicts an exploded view of a clip.

As shown in FIGS. 1 and 2, a set of clips 300 is attached to a hanger 200 by a fastener 6. The hanger 200 includes a hook 1, first and second collars 2, 3, and eyelet 5. A fastener 4 is connected between the first and second collars 2, 3. Each clip 300 of the set of clips is attached to the hanger 200 by a strap 6. Each clip 300 includes a clasp, a tab having a first opening 8, a second opening 7, and a tongue 9. One of the clips 300 secures a pair of socks 11 to the hanger 200. In FIG. 2, a second pair of socks 15, 16 secured by a clip 12 is shown with one of the socks 15 draped over the hook 14 and secured in place by a fastener 13.

As shown in FIGS. 3 and 5-12, the clip 300 includes the tab 10 extending from the u-shaped clasp 29. The tab 10 includes the first opening 8 adjacent to the closed end 30 of the clasp 31, and adjacent to a pull tab 25 of the tongue 9. The second opening 7 is disposed in the tab 10 at a distal end of the tab 10 from the clasp 31. The clasp 31 further includes a closed end 24. The clasp 31 includes a first side having a wall 29, and a second side having two prongs 27, 28. The wall 29 and the prongs 27, 28 extend from the closed end 30 to the open end 24. Teeth 17 extend from the wall 29 towards the tongue 9 and the closed end 30. Teeth 23 extend from the tongue 9 towards the wall 29 and the closed end 30. Pivot rod 18 extends through tongue 9 and into openings 19 in the prongs 27, 28 at the open end 24 of the clasp 31. Ridges 22 extend outwards from the prongs 27, 28 and are disposed adjacent to the tongue 9. Spherical protrusions 20 extend from the tongue 9 towards the closed end-side of the prongs 27, 28. Cavities 21 are disposed in the closed-end sides of the prongs 27, 28, and correspond to the spherical protrusions. The cavities 21 are disposed along an arc formed by the protrusions 20 as the tongue 9 rotates about a pivot point formed by the pivot rod 18.

Figure 4:
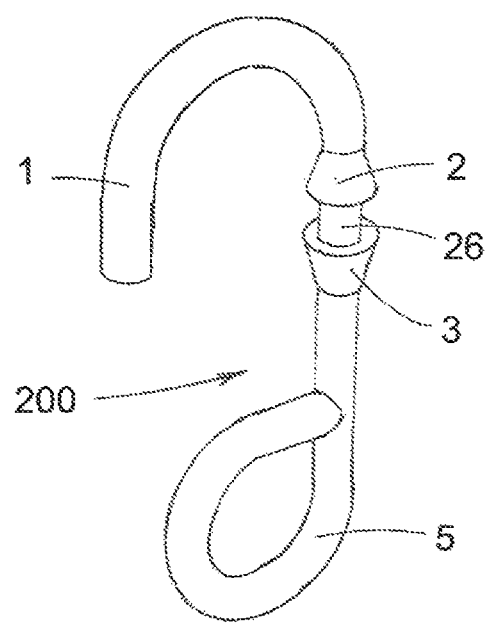
FIG. 4 depicts a hanger.
Figure 5:
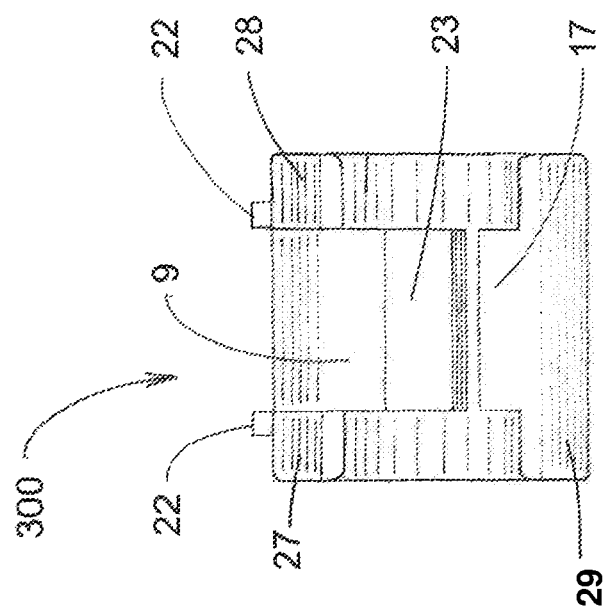
FIG. 5 depicts a front view of a closed clip.
Figure 6:
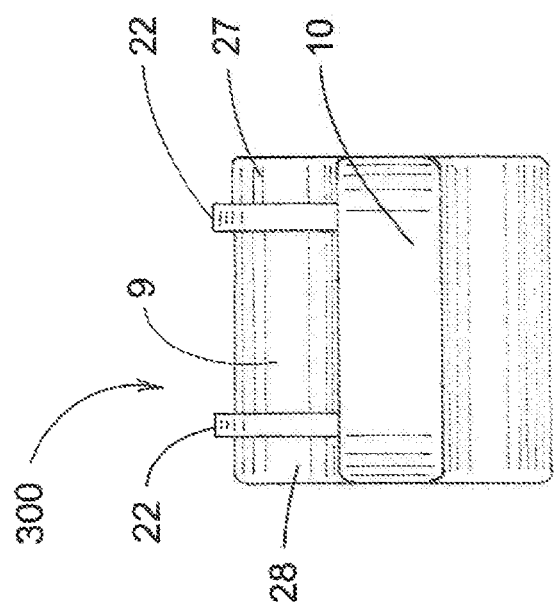
FIG. 6 depicts a rear view of a closed clip.
Figure 7:
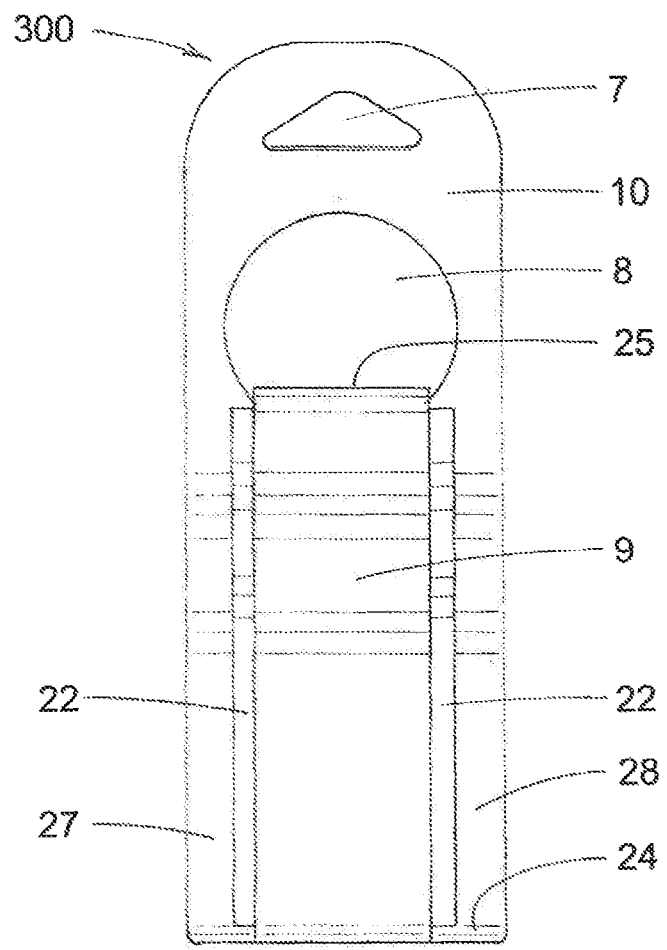
FIG. 7 depicts a top view of a closed clip.
Figure 8:
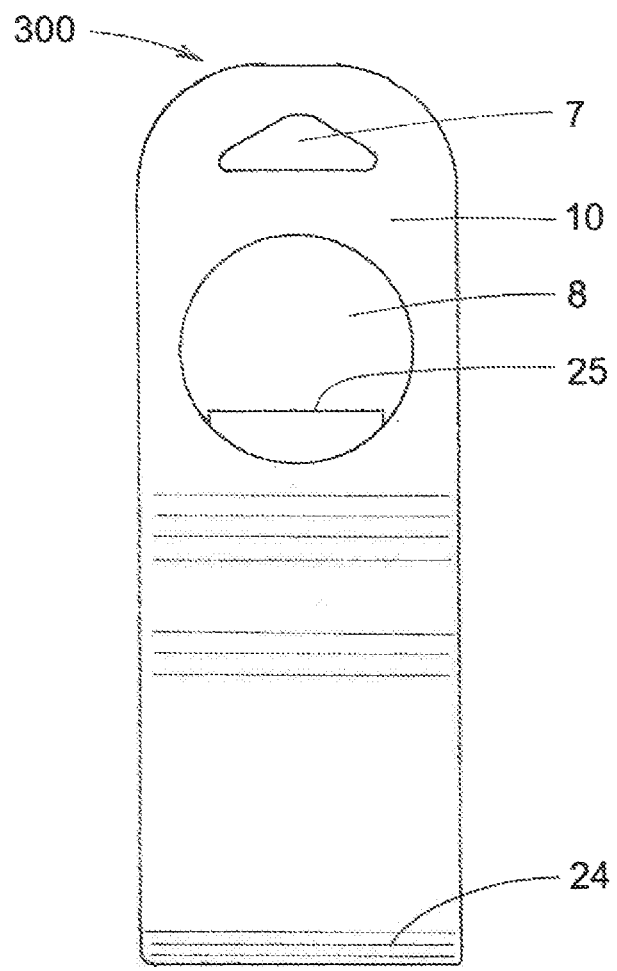
FIG. 8 depicts a bottom view of a closed clip.
Figure 9:
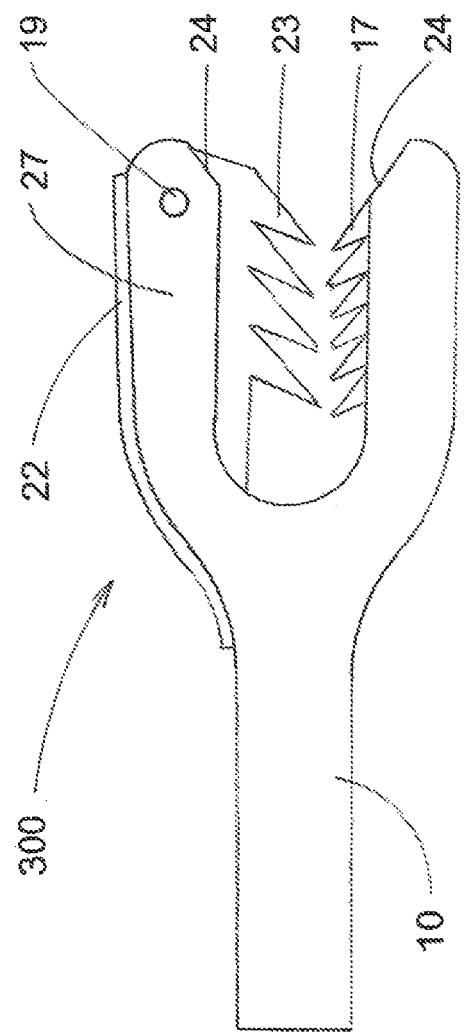
FIG. 9 depicts a side view of a closed clip.

As shown in FIG. 4, the hanger 200 includes a hook 1, an eyelet 5, collars 2, 3 and a shaft 26. The depicted embodiment shows conical collars 2, 3. The shaft 26 extends from the eyelet 5, between the collars 2, 3, and to the hook 1. As depicted, the collars 2, 3, the shaft 26, the hook 1 and the eyelet 5 are monolithic, such as because of being formed by plastic injection molding. However, any combination of such features may be separately formed and connected to the other, monolithically formed features. For example, the hook 1, the eyelet 5 and the shaft 26 may be monolithic, and the collars 2, 3 may thereafter be added. Or, the hook 1 and the collar 2 may be monolithic, and the eyelet 5 and the collar 3 may be monolithic. The shaft 26 may thereafter be added to couple the collars 2, 3.

Figure 13:
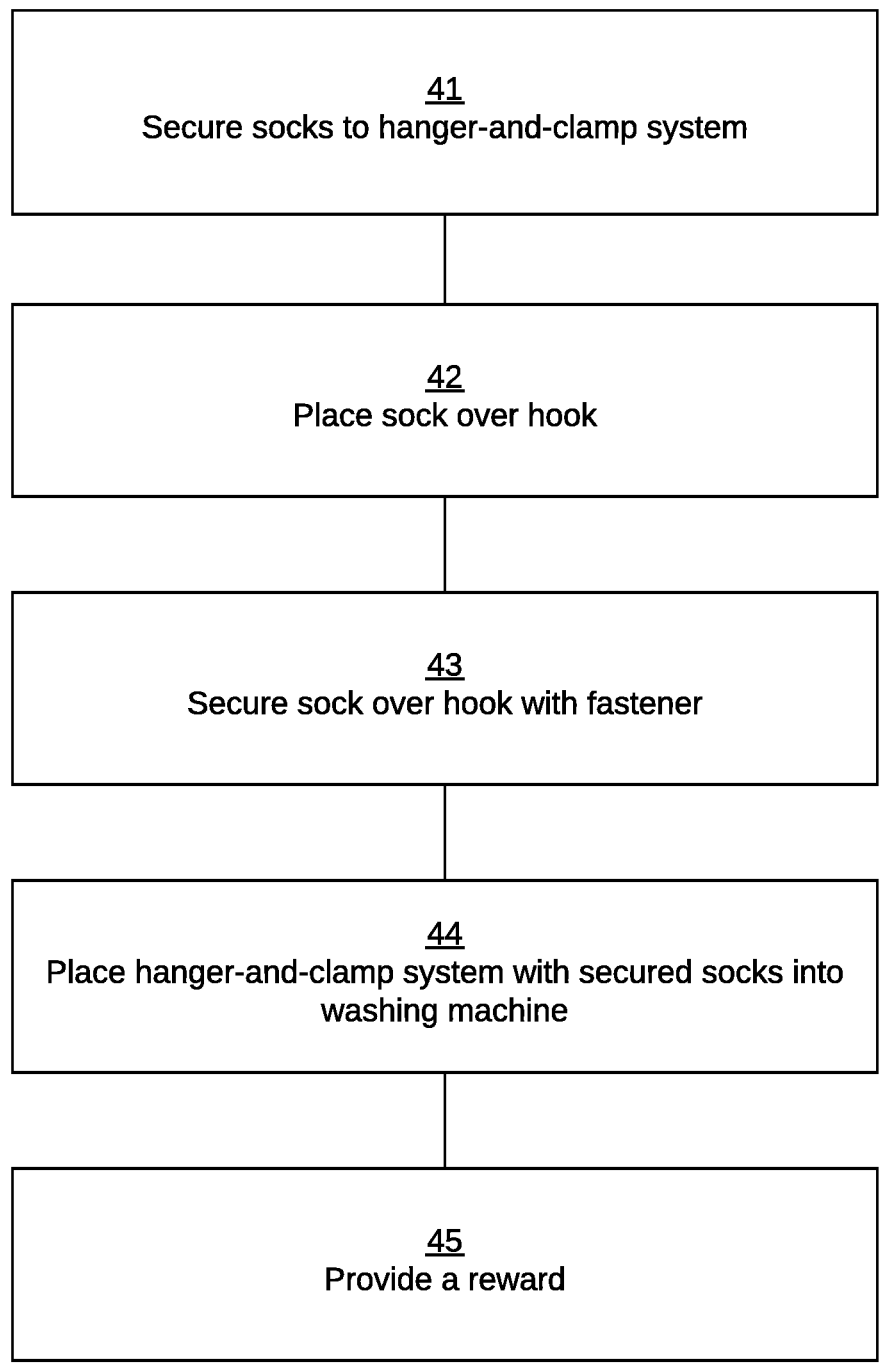
FIG. 13 depicts a method of using a hanger-and-clip system.

As shown in FIG. 13, a method of washing a pair of socks using the hanger-and-clip system described above includes, at step 41, securing a pair of socks to the hanger-and clip system; at step 42, placing at least one sock over the hook; at step 43, securing the cloth over the hook with the fastener; at step 44, placing the hanger-and-clip system with the secured sock into a washing machine; and at step 45, providing a reward after securing the sock to the hanger with the clip or placing the hanger-and-clip system with the secured sock into the washing machine.

Figure 10:
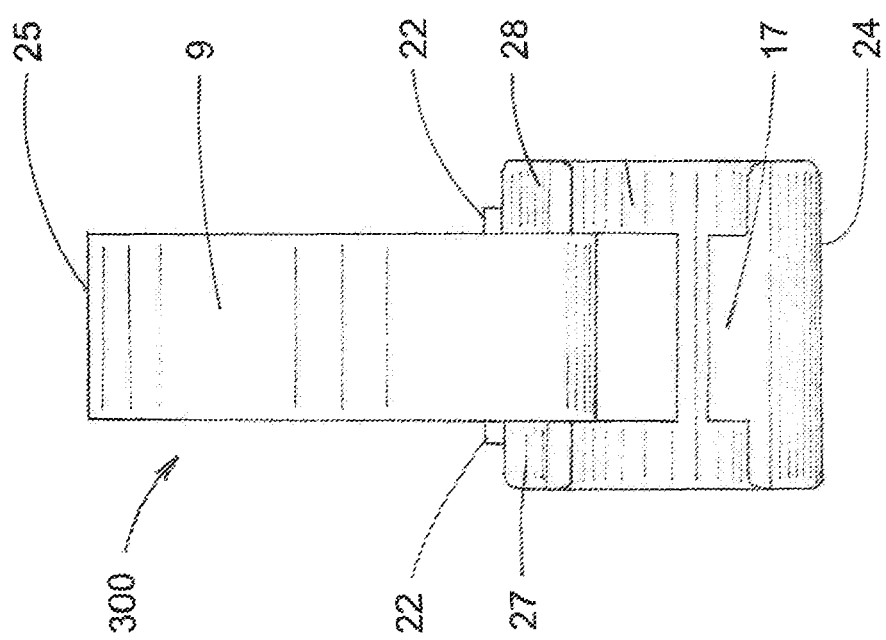
FIG. 10 depicts a front view of an opened clip.
Figure 11:
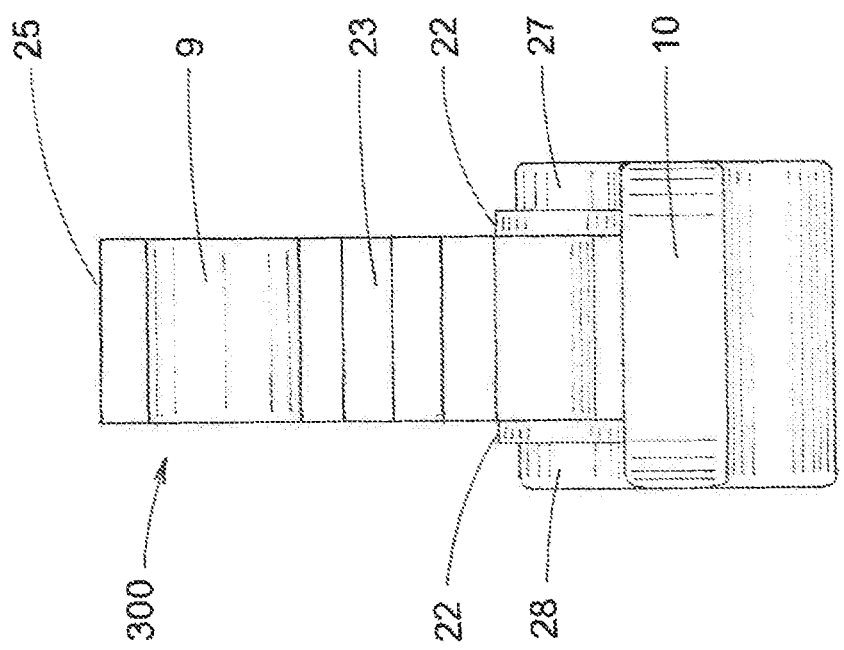
FIG. 11 depicts a rear view of an opened clip.
Figure 12:
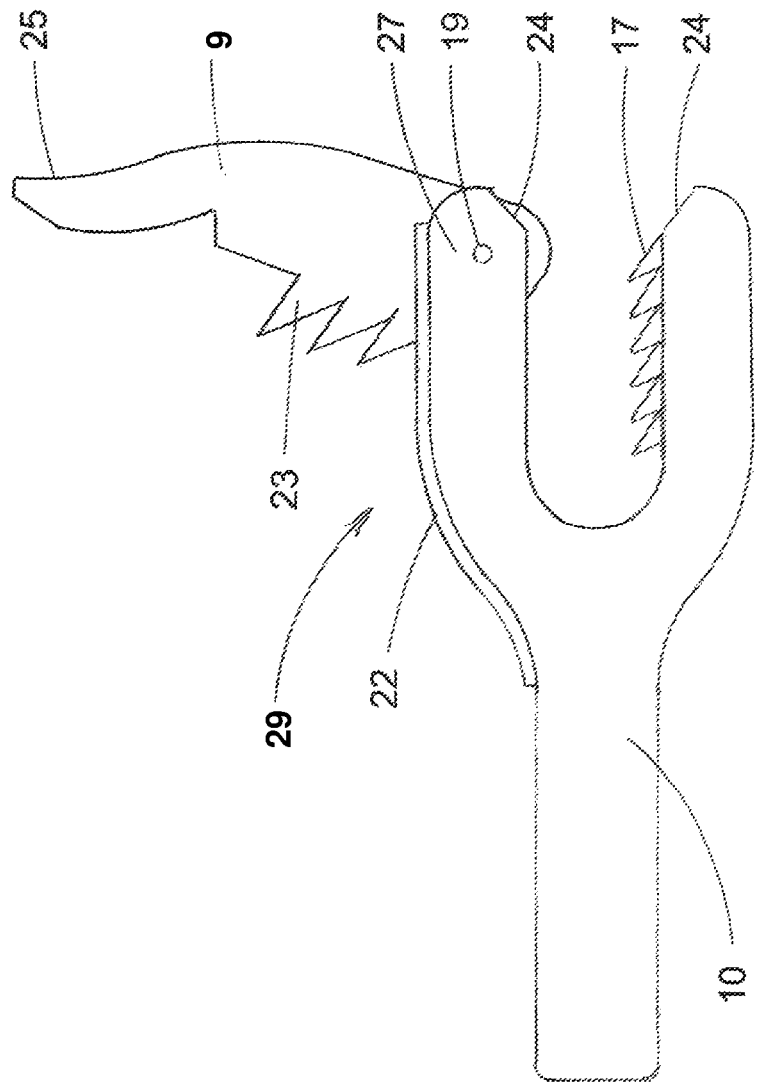
FIG. 12 depicts a side view of an opened clip.

The claimed apparatus may be used to secure a material by placing the material through the open end of the u-shaped clip as the tongue is in an open position, such as is shown in FIGS. 10-12. The tongue may be pressed down towards a closed position, such as is shown in FIGS. 5-9, while holding the material in place between the teeth of the tongue and the teeth of the bottom wall of the clasp. The protrusions from the tongue may extend into the cavities to secure the clasp m the closed position. Multiple cavities may be provided to allow for securing materials of a variety of thicknesses, or a various number of materials. For example, a single pair of cotton socks may be secured by pressing the tongue until the protrusions extend into the innermost cavities, a single pair of wool winter socks may be secured by pressing the tongue until the protrusions extend into the middle cavities, and multiple pairs of socks may be secured by pressing the tongue until the protrusions extend into the outermost cavities. Alternatively, rims of the socks may be placed through the open end of the clasp, and the tongue may be depressed until it cannot be depressed further. In such a case, the tongue will rebound outwards until the protrusions extend into the nearest set of cavities in the rebounding direction.

The ridges adjacent to the tongue may be provided to prevent the tongue from catching on other objects in the washing machine as the tongue secures a pair of socks together. The ridges may be flush with the top of the tongue (i.e. the side of the tongue opposite the teeth), or the ridges may rise above the tongue. In a similar manner, the closed end of the clasp may shield the pull tab of the tongue. The opening in the clip tab adjacent to the closed end of the clasp may be provided to allow a user to pry open the clasp by pulling on the pull tab of the tongue.

The teeth may have a size and spacing that vary between embodiments, each embodiment optimized for the particular type of material for which the clip is to be used. For example, the teeth may be shorter and denser for harder materials, and longer and less dense for softer materials. Additionally, the teeth may be angled towards the closed end of the clasp. In such a configuration, pulling on a material secured by the clasp will result in a force the pulls the tongue tighter into the clasp, thereby resisting any tendency of the material to pull out of the clasp.

The design described herein for the clip is a significant improvement over other similar clamps and/or clips, such as those described in the Background section above. The design is particularly attuned to harsh environments, such as during the agitation cycle in a washing machine. The ridges and closed end of the clasp protect the tongue from catching on other objects and pulling open. The protrusions and cavities secure the tongue closed. The teeth cause the tongue to be pulled closed as the material is tugged on because the teeth catch onto the material. The opening in the tab adjacent the closed end of the clasp allows a user to easily open the clasp by pulling outward on the pull tab of the tongue.

Because the design described herein is able to withstand harsh environments where pulling forces might result in the failure of other clamping apparatuses, the claimed design has an added benefit of allowing sets of materials that correspond to a particular owner or user to remain sorted during the washing process. For example, a group of individuals A, B and C may share a living space and a clothes washing machine. A, B and C may each use separate sock sets from each other. When a user has a pair of soiled socks that need to be washed, the socks may be clipped to the hanger using the design described herein. The socks may be hung by the hanger-and-clip system from, for example, a laundry hamper. The hanger may have a particular color that is unique to the user. The hanger-and-clip system may include several clips attached to the hanger. Each user may clip several pairs of socks to his/her respective, color-coded hanger-and-clip system. On laundry day, A, B and C may all put their respective hanger-and-clip systems, with attached socks, into the same washing machine. A wash cycle may be ran, and afterwards, each of A, B and C may retrieve his/her socks by simply identifying his/her hanger by color, then pulling the identified hanger-and-clip system out of the washing machine. The same process may be performed after the socks have been dried in a clothes drying machine.

The reward method may provide incentives and accountability for a user to regularly employ the hanger-and-clip system. Color-coding the hanger-and-clip system with the tokens may allow other users to know quickly which user is entitled to a reward. Users may develop their own rewards list corresponding to token values, and may redeem such rewards when the proper value of tokens has been collected. Users may accumulate several tokens, and may retain such tokens in a receptacle. The receptacle may be color-coded to match the user's tokens and hanger. In one embodiment, the receptacle may be a glass jar with a slotted, removable lid. The lid may be color-coded to match the color of the user's tokens and hanger.

We claim:

1. A clipping apparatus, comprising:
   a clasp, comprising:
      an open end and a closed end;
      a first side, comprising:
         a wall extending from the closed end to the open end; and
         a first tooth extending towards an inside of the clasp;
      a second side, comprising a first prong and a second prong extending from the closed end to the open end; and
      a tongue rotatably connected to the first prong and the second prong between the first prong and the second prong at the open end of the clasp, wherein the tongue comprises a second tooth extending towards the inside of the clasp in a closed position of the clasp;
      a protrusion located on one of the first prong and the tongue and a plurality of cavities located on the other of the first prong and the tongue, wherein:
         the protrusion rests in a first of the plurality of cavities in the closed position of the clasp;
         the protrusion and the plurality of cavities secure the tongue in the closed position of the clasp;
         the plurality of cavities are arranged in an arc;
         a shape and positioning of the arc corresponds to a path traced by the protrusion as the tongue rotates between the first prong and the second prong; and
         wherein a force applied to the second tooth in a direction away from the closed end of the clasp moves the protrusion to a second of the plurality of cavities closer to the inside of the clasp; and
   a tab coupled to and extending from the closed end of the clasp, the tab comprising an opening adjacent to the closed end of the clasp.

2. The clipping apparatus of claim 1, wherein the first tooth or the second tooth is angled towards the closed end of the clasp.

3. The clipping apparatus of claim 1, further comprising a ridge on an exterior surface of the first prong or the second prong, the ridge adjacent to the tongue.

4. The clipping apparatus of claim 1, the protrusion disposed on the tongue at an end of the tongue opposite a pivot point of the tongue about which the tongue rotates between the first prong or the second prong.

5. The clipping apparatus of claim 1, the tongue connected by one or more pivot rods to the first prong or the second prong, the pivot rods disposed at the open end.

6. The clipping apparatus of claim 1, further comprising a pull-tab extending from the tongue at the closed end of the clasp over the opening, wherein:
   a first portion of the opening adjacent to the closed end is covered by the pull-tab; and
   a second portion of the opening remains uncovered by the pull-tab.

7. The clipping apparatus of claim 1, further comprising a second opening in the tab, wherein:
   the second opening extends through the tab; and
   the second opening is positioned in the tab at a distal end of the tab from the closed end of the clasp.

8. A hanger-and-clip system, comprising:
   a clip, comprising:
      a u-shaped clasp, comprising:
         an open end and a closed end;
         a first side and a second side, the first side comprising a wall extending from the closed end to the open end, and the second side comprising two prongs extending from the closed end to the open end; and
         a tongue rotatably connected to the two prongs between the two prongs; and
      a tab coupled to and extending from the clasp, the tab comprising a first opening adjacent the closed end of the clasp, and a second opening at a distal end of the tab from the clasp; and
   a hanger, comprising:
      a hook;
      an eyelet coupled to the hook by a shaft; and
      a collar disposed along the shaft between the eyelet and the hook, wherein the clip is connected to the hanger by a strap, the strap passing through the eyelet and the second opening.

9. The hanger-and-clip system of claim 8, wherein the collar is conical.

10. The hanger-and-clip system of claim 8, comprising a second collar disposed along the shaft between the eyelet and the collar.

11. The hanger-and-clip system of claim 10, wherein a portion of the shaft extends between the two collars.

12. The hanger-and-clip system of claim 8, wherein one or more of the collar, the shaft, the eyelet and the hook are monolithic.

13. A method of washing a cloth material, comprising:
  securing the cloth material to a hanger-and-clip system, the system comprising:
    a clip, comprising:
      a u-shaped clasp, comprising:
        an open end and a closed end;
        a first side and a second side, the first side comprising a wall extending from the closed end to the open end, and the second side comprising two prongs extending from the closed end to the open end; and
        a tongue rotatably connected to the two prongs between the two prongs; and
      a tab coupled to and extending from the clasp, the tab comprising a first opening adjacent the closed end of the clasp, and a second opening at a distal end of the tab from the clasp; and
    a hanger, comprising:
      a hook;
      an eyelet coupled to the hook by a shaft; and
      a collar disposed along the shaft between the eyelet and the hook,
    wherein the clip is connected to the hanger by a strap, the strap passing through the eyelet and the second opening.

14. The method of claim 13, wherein the hanger-and-clip system further comprises a fastener attached to the shaft between the collar and the eyelet.

15. The method of claim 14, further comprising placing the cloth over the hook.

16. The method of claim 15, further comprising securing cloth the cloth over the hook with the fastener.

17. The method of claim 13, further comprising placing in the hanger-and-clip system with the secured cloth into a washing machine.

18. The method of claim 17, further comprising providing a reward after securing the cloth material to the hanger-and-clip system or placing the hanger-and-clip system with the secured cloth into the washing machine.

19. The method of claim 18, wherein the reward comprises a token, wherein the token represents a value corresponding to one or more prizes redeemable with the token.

20. The method of claim 19, wherein the token comprises a color corresponding to a color of the hanger.

\* \* \* \* \*